(12) United States Patent
Yamada et al.

(10) Patent No.: US 7,856,459 B2
(45) Date of Patent: *Dec. 21, 2010

(54) RECORDING APPARATUS, RECORDING METHOD, AND DISC SHAPED RECORD MEDIUM

(75) Inventors: Makoto Yamada, Tokyo (JP); Satoshi Tsujii, Tokyo (JP); Toshihiro Ishizaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/029,823

(22) Filed: Jan. 5, 2005

(65) Prior Publication Data

US 2005/0125380 A1 Jun. 9, 2005

Related U.S. Application Data

(63) Continuation of application No. 09/662,699, filed on Sep. 15, 2000, now Pat. No. 6,871,205.

(30) Foreign Application Priority Data

Sep. 17, 1999 (JP) ................................ 11-264630

(51) Int. Cl.
*G06F 17/30* (2006.01)
(52) U.S. Cl. ........................ 707/830; 707/741; 715/838
(58) Field of Classification Search .................... 707/1, 707/104.1, 5, 100, 205, 200, 102, 2, 3, 602, 707/705, 736, 741, 745, 802, 803, 812, 830, 707/E17.056, E17.057, 913, 914, 915, 953, 707/957, 999.104, 999.205; 711/4, 100; 715/201, 202, 203, 716, 838, 839
See application file for complete search history.

(56) References Cited

U.S. PATENT DOCUMENTS 4,945,475 A 7/1990 Bruffey et al. .................. 707/1

(Continued)

FOREIGN PATENT DOCUMENTS

EP 0 424 903 5/1991

(Continued)

OTHER PUBLICATIONS

Saraceno, Video Content Extraction and Representation Using a Joint Audio and Video Processing, Acoustic, Speech, and Signal Processing, 1999. ICASSP '99. Proceedings., 1999 IEEE International Conference on, Mar. 15-19, 1999, pp. 3033-3036.*

(Continued)

*Primary Examiner*—Greta L Robinson
(74) *Attorney, Agent, or Firm*—Frommer Lawrence & Haug LLP; William S. Frommer; Thomas F. Presson (57) ABSTRACT

A digital recording apparatus using a disc shaped record medium is disclosed, that comprises a means for extracting outlined information of each of a plurality of files recorded on the disc shaped record medium, a means for correlating the extracted outlined information and the plurality of files and generating an index file, and a means for recording the index file to a predetermined position of the disc shaped record medium, wherein when a predetermined operation mode is performed, a plurality of types of data of the plurality of files are output in a predetermined format.

44 Claims, 11 Drawing Sheets

U.S. PATENT DOCUMENTS

| | | | | |
|---|---|---|---|---|
| 5,588,149 | A * | 12/1996 | Hirose | 707/1 |
| 5,652,879 | A | 7/1997 | Harris et al. | 707/101 |
| 5,655,117 | A | 8/1997 | Goldberg et al. | 707/102 |
| 5,751,281 | A | 5/1998 | Hoddie et al. | 715/500.1 |
| 5,864,868 | A * | 1/1999 | Contois | 707/104.1 |
| 5,905,988 | A | 5/1999 | Schwartz et al. | 707/104.1 |
| 6,018,744 | A * | 1/2000 | Mamiya et al. | 707/104.1 |
| 6,023,705 | A * | 2/2000 | Bellinger et al. | 707/200 |
| 6,065,010 | A * | 5/2000 | Otsuka et al. | 707/101 |
| 6,085,185 | A | 7/2000 | Matsuzawa et al. | 707/2 |
| 6,144,969 | A * | 11/2000 | Inokuchi et al. | 707/200 |
| 6,282,549 | B1 | 8/2001 | Hoffert et al. | 707/104.1 |
| 6,301,587 | B1 * | 10/2001 | Kim et al. | 707/101 |
| 6,374,258 | B1 | 4/2002 | Fujita et al. | 707/104.1 |
| 6,460,047 | B1 | 10/2002 | Ambroziak | 707/102 |
| 6,584,463 | B2 | 6/2003 | Morita et al. | 707/3 |
| 6,871,205 | B1 * | 3/2005 | Yamada et al. | 707/104.1 |

FOREIGN PATENT DOCUMENTS

| | | |
|---|---|---|
| JP | 8 44856 | 2/1996 |
| JP | 8 63485 | 3/1996 |
| JP | 8 163507 | 6/1996 |
| JP | 8 287654 | 11/1996 |
| JP | 9 213056 | 8/1997 |
| JP | 9 247597 | 9/1997 |
| JP | 2712656 | 10/1997 |
| JP | 10 55657 | 2/1998 |
| JP | 10 341402 | 12/1998 |
| JP | 2940872 | 6/1999 |
| JP | 11 234623 | 8/1999 |

OTHER PUBLICATIONS

Chang et al., Integrated Image and Speech Analysis for Content-Based Video Indexing, Proceedings of the Third IEEE International Conference on Multimedia Computing and Systems, p. 306-313, Jun. 1996.

Saraceno, C., Video Content Extraction and Representation Using a Joint Audio and Video Processing, Proceedings 1999 IEEE Inter. Conf. on Acoustics, Speech, and Signal Processing, vol. 6 p. 3033-33036, Mar. 1999.

Patent Abstracts of Japan, vol. 1997, No. 12, Dec. 25, 1997 & JP 09 213056 A (Sharp Corp.), Aug. 15, 1997.

* cited by examiner

| RBP | Length | Length |
|---|---|---|
| 0 | L_AP1 | AV File Property #1 |
| L_AP1 | L_AP2 | AV File Property #2 |
| L_AP1+L_AP2 | L_AP3 | AV File Property #3 |
| ⋮ | ⋮ | ⋮ |
|  | L_APn | AV File Property #n |

Fig. 7

| RBP | Length | Field Name |
|---|---|---|
| 0 | 1 | Version |
| 1 | 2 | Flags |
| 3 | 1 | Data Type |
| 4 | 4 | Creation Time |
| 8 | 4 | Modification Time |
| 12 | 4 | Duration |
| 16 | L_FI | File Identifier |

Fig. 8

| BIT | VALUE | DESCRIPTION |
|---|---|---|
| 0 | 0 | RECORDED DATA IS FILE |
|   | 1 | RECORDED DATA IS SET OF GROUPED FILES OR DIRECTORY |
| 1 | 0 | AV FILE DOES NOT CONTAIN FILE TO BE REFERENCED |
|   | 1 | AV FILE CONTAINS FILE TO BE REFERENCED |
| 2 | 0 | AV FILE DOES NOT CONTAIN TITLE |
|   | 1 | AV FILE CONTAIN TITLE |
| 3 | 0 | AV INDEX FILE CONTAINS DATA OF TITLE |
|   | 1 | AV FILE DESIGNATED BY DATA OF PROPERTY CONTAINS DATA OF TITLE |
| 4 | 0 | AV FILE DOES NOT CONTAIN THUMBNAIL PICTURE |
|   | 1 | AV FILE CONTAINS THUMBNAIL PICTURE |
| 5 | 0 | AV INDEX FILE CONTAINS DATA OF THUMBNAIL PICTURE |
|   | 1 | AV FILE DESIGNATED BY PROPERTY TRACK CONTAINS DATA OF THUMBNAIL PICTURE |
| 6 | 0 | AV FILE DOES NOT CONTAIN DATA OF INTRO MUSIC |
|   | 1 | AV FILE CONTAINS DATA OF INTRO MUSIC |
| 7 | 0 | AV INDEX FILE CONTAINS DATA OF INTRO MUSIC |
|   | 1 | AV FILE DESIGNATED BY DATA OF PROPERTY CONTAINS DATA OF INTRO MUSIC |
| OTHERS |   | RESERVE |

Fig. 9

| RBP | Length | Field Name |
|---|---|---|
| 0 | L_AT1 | AV File Title #1 |
| L_AT1 | L_AT2 | AV File Title #2 |
| L_AT1+L_AT2 | L_AT3 | AV File Title #3 |
| ⋮ | ⋮ | ⋮ |
|  | L_ATn | AV File Title #n |

Fig. 10

| RBP | Length | Field Name |
|---|---|---|
| 0 | L_TH1 | AV File Thumbnail Picture #1 |
| L_TH1 | L_TH2 | AV File Thumbnail Picture #2 |
| L_TH1+L_TH2 | L_TH3 | AV File Thumbnail Picture #3 |
| ⋮ | ⋮ | ⋮ |
|  | L_THn | AV File Thumbnail Picture #n |

Fig. 11

| RBP | Length | Field Name |
|---|---|---|
| 0 | L_IS1 | AV File Intro Music #1 |
| L_IS1 | L_IS2 | AV File Intro Music #2 |
| L_IS1+L_IS2 | L_IS3 | AV File Intro Music #3 |
| ⋮ | ⋮ | ⋮ |
|  | L_ISn | AV File Intro Music #n |

RECORDING APPARATUS, RECORDING METHOD, AND DISC SHAPED RECORD MEDIUM

This is a Continuation of application Ser. No. 09/662,699 filed Sep. 15, 2000 now U.S. Pat. No. 6,871,205.

BACKGROUND OF THE INVENTION

1. Field of the Invention

The present invention relates to a record apparatus, a recording method, and a disc shaped record medium that allow a reproducing operation and/or an editing operation to be easily performed.

2. Description of the Related Art

In a recording apparatus such as a camcorder that records video data and/or audio data, several Pictures and a sound thereof are recorded as a file. Such a recording and reproducing apparatus may have a display portion such as a liquid crystal display panel and a sound generating portion such as a speaker that allow recorded data to be reproduced and/or edited. In such a recording and reproducing apparatus, when a random-accessible record medium such as a magneto-optical disc is used, the user can designate a file so as to select his or her desired program to be reproduced or edited.

In recent years, as a multi-media system software program, QuickTime is known. The QuickTime is a software program that allows data that varies on time base (this data is referred to as movie) to be handled. A movie contains a moving picture, a voice, and a text. Currently, a QuickTime file format is available as a Macintosh platform of Apple. The QuickTime file format is an MPEG-1 (Moving Picture Experts Group phase 1) program stream file storage format of which a video elementary stream and an audio elementary stream are multiplexed on time base). In the storage format, the entire MPEG-1 file (namely, one whole closed scene) is treated as a sample of the QuickTime file format regardless of the duration thereof. Such a large sample is treated as one large chunk.

In addition, audio data and video data are stored together on one track (or one medium) in the QuickTime file format. As a new medium type that represents such data portions contained in a large sample or a large chunk, MPEG Media has been defined.

In this case, a file is designated by inputting for example a file name or the like. However, when many files have been recorded, since it is difficult for the user to memorize a file name and so forth of a file for which he or she wants to perform a reproducing operation, an editing operation, or the like, the operability of the apparatus may deteriorate.

OBJECTS AND SUMMARY OF THE INVENTION

Therefore, an object of the present invention is to provide a recording apparatus, a recoding method, and a disc shaped record medium that allow a reproducing operation and/or an editing operation to be easily performed.

A first aspect of the present invention is a digital recording apparatus using a disc shaped record medium, comprising a means for extracting outlined information of each of a plurality of files recorded on the disc shaped record medium, a means for correlating the extracted outlined information and the plurality of files and generating an index file, and a means for recording the index file to a predetermined position of the disc shaped record medium, wherein when a predetermined operation mode is performed, a plurality of types of data of the plurality of files are output in a predetermined format.

A second aspect of the present invention is a digital recording method using a disc shaped record medium, comprising the steps of extracting outlined information of each of a plurality of files recorded on the disc shaped record medium, correlating the extracted outlined information and the plurality of files and generating an index file, and recording the index file to a predetermined position of the disc shaped record medium, wherein when an operation mode including a reproducing operation is performed, a plurality of types of data of the plurality of files are output in a predetermined format.

A third aspect of the present invention is a disc shaped record medium for recording a plurality of files and an index file, the index file correlating outlines information of the plurality of files and the plurality of files, the index file being recorded at a predetermined position of the disc shaped record medium.

According to the present invention, outlined information of each of a plurality of files recorded on a disc shaped record medium is output. Desired data can be easily searched from the outlined information.

The applicant of the present invention has the following patents as prior patents of the present invention:

(1) U.S. Pat. No. 4,945,475
(2) U.S. Pat. No. 5,253,053
(3) U.S. Pat. No. 5,652,879

These and other objects, features and advantages of the present invention will become more apparent in light of the following detailed description of a best mode embodiment thereof, as illustrated in the accompanying drawings.

DETAILED DESCRIPTION OF THE PREFERRED EMBODIMENTS

Figure 1:
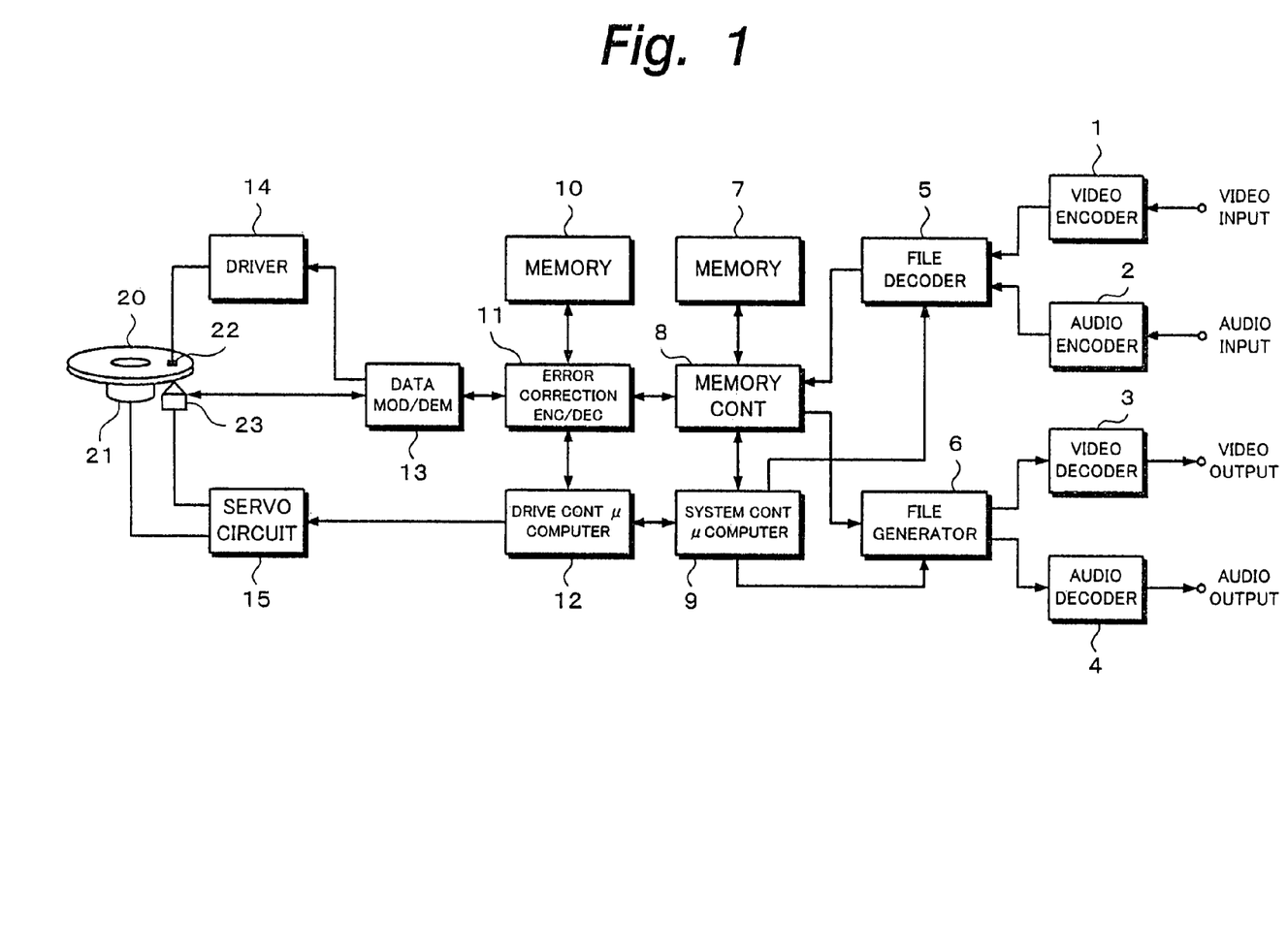
FIG. 1 is a block diagram showing an example of the structure of a digital recording and reproducing apparatus according to an embodiment of the present invention.

FIG. 1 shows an example of the structure of a digital recording and reproducing apparatus according to an embodiment of the present invention. An optical system (not shown) photographs a picture and supplies photographed light thereof to an image pickup device such as a CCD (Charge Coupled Device). The CCD generates a video signal corresponding to the photographed light and supplies the generated video signal to a video encoder 1 shown in FIG. 1. The video encoder 1 compression-encodes the video signal. In addition, an audio signal generating portion such as a microphone generates an audio signal and supplies it to an audio encoder 2. The audio encoder 2 compression-encodes the audio signal. The compression-encoding method applied for the video signal and the audio signal is for example MPEG. Output signals of the video encoder 1 and the audio encoder 2 are referred to as elementary streams.

When MPEG is used, the video encoder 1 is composed of a motion predicting portion, a picture sequence rearranging portion, a subtracting portion, a DCT portion, a quantizing portion, a variable length code encoding portion, and a buffer memory. The motion predicting portion detects a moving vector. The subtracting portion forms a predictive error between an input picture signal and a locally decoded picture signal. The DCT portion transforms an output signal of the subtracting portion corresponding to the DCT method. The quantizing portion quantizes an output signal of the DCT portion. The variable length encoding portion encodes an output signal of the quantizing portion into a signal having a variable length. The buffer memory outputs the encoded data at a constant data rate. The picture sequence rearranging portion rearranges the sequence of pictures corresponding to the encoding process. In other words, the picture sequence rearranging portion rearranges the sequence of pictures so that after I and P pictures are encoded, a B picture is encoded. The local decoding portion is composed of an inverse quantizing portion, an inverse DCT portion, an adding portion, a frame memory, and a motion compensating portion. The motion compensating portion performs all of a forward predicting operation, a reverse predicting operation, and a bidirectional predicting operation. When the intra encoding process is performed, the subtracting portion directly passes data, not performs the subtracting process. The audio encoder 2 comprises a sub-band encoding portion and an adaptively quantized bit allocating portion.

As an example, in the case of a portable disc recording and reproducing apparatus with a built-in camera, a picture photographed by the camera is input as video data. In addition, a voice collected by a microphone is input as audio data. The video encoder 1 and the audio encoder 2 convert analog signals into digital signals. According to the embodiment of the present invention, a rewritable optical disc is used as a record medium. Examples of such an optical disc are a magneto-optical disc and a phase-change type disc. According to the embodiment of the present invention, a magneto-optical disc having a relatively small diameter is used.

Output signals of the video encoder 1 and the audio encoder 2 are supplied to a file generator 5. The file generator 5 converts output signals of the video encoder 1 and the audio encoder 2 into a video elementary stream and an audio elementary stream so that they can be handled corresponding to a computer software program for synchronously reproducing a moving picture and a sound without need to use a dedicated hardware portion. According to the embodiment of the present invention, for example, as such a software program, QuickTime is used. QuickTime is a software program that allows various types of data such as a still picture, a text, an audio sound, and MIDI (Musical Instrument Digital Interface) as well as a moving picture to be handled and controlled on time base. A file that contains various types of data using QuickTime is referred to as QuickTime movie file.

The file generator 5 multiplexes encoded video data and encoded audio data. To generate a QuickTime movie file, a system controlling microcomputer 9 controls the file generator 5. An index file according to the present invention is also generated by the file generator 5.

QuickTime movie files generated by the file generator 5 are successively written to a memory 7 through a memory controller 8. When the system controlling microcomputer 9 issues a data write request for a disc to the memory controller 8, the memory controller 8 reads a QuickTime movie file from the memory 7. In this example, the transfer rate of the encoding process for a QuickTime movie file is lower than that for data written to the disc. For example, the former is half of the latter. Thus, although QuickTime movie files are successively written to the memory 7, they are intermittently read from the memory 7 under the control of the system controlling microcomputer 9 in such a manner that the memory 7 is prevented from overflowing or underflowing.

A QuickTime movie file that is read from the memory 7 through the memory controller 8 is supplied to an error correction encoder/decoder 11. The error correction encoder/decoder 11 temporarily writes a QuickTime movie file to a memory 10. The error correction encoder/decoder 11 performs an interleaving process and an error correction code encoding process so as to generate redundant data. The error correction encoder/decoder 11 reads the QuickTime movie file with redundant data from the memory 10.

Output data of the error correction encoder/decoder 11 is supplied to a data modulator/demodulator 13. When digital data is recorded on the disc, the data modulator/demodulator 13 modulates the data in such a manner that a clock signal can be easily extracted so that data can be recorded on a disc free from a problem such as an inter-code interference.

An output signal of the data modulator/demodulator 13 is supplied to a magnetic field modulating driver 14. In addition, a signal for driving an optical pickup 23 is output to the magnetic field modulating driver 14. The magnetic field modulating driver 14 drives a magnetic field head 22 corresponding to the input signal so as to apply a magnetic field to an optical disc 20. The optical pickup 23 radiates a recording laser beam to the optical disc 20. In such a manner, data is recorded on the optical disc 20. The optical disc 20 is rotated at CLV (Constant Linear Velocity), CAV (Constant Angular Velocity), or ZCAV (Zone CLV of which the disc surface area is divided into for example three areas in each of which the optical disc 20 is rotated at CAV in such a manner that the velocity of the innermost area is the highest and the velocity of the outermost area is the lowest) so that their linear velocities nearly become the same.

Since data that is intermittently read from the memory controller 8 is recorded to the optical disc 20, data is not successively recorded. In other words, after a predetermined amount of data is recorded, the recording operation is stopped until the next record request is received.

When the system controlling microcomputer 9 issues a request to a drive controlling microcomputer 12, it issues a request to a servo circuit 15 so as to control the entire disc drive. Thus, the disc drive performs a recording operation. The servo circuit 15 performs a disc radial moving servo operation, a tracking servo operation, and a focus servo operation for the optical pickup 23. In addition, the servo circuit 15 performs a spindle servo operation for a motor 21. In association with the system controlling microcomputer 9, a user operation input portion (not shown) is disposed.

Next, the structure and operation of the reproducing portion will be described. When data is reproduced, a reproducing laser beam is radiated to the optical disc 20. A detector of the optical pickup 23 converts the reflected light of the optical disc 20 into a reproduction signal. A tracking error and a focus error are detected from an output signal of the detector of the optical pickup 23. The servo circuit 15 controls the optical pickup 23 so that the optical pickup 23 is placed and focused on a desired track. In addition, the servo circuit 15 controls the radial movement of the optical pickup 23 so that it reproduces data on a desired track of the optical disc 20.

As with the recording operation, when data is reproduced, the transfer rate of data reproduced from the optical disc 20 is higher than that of a QuickTime movie file. For example, the transfer rate of data reproduced form the optical disc 20 is twice as large as the transfer rate of a QuickTime movie file. Likewise, data is not successively reproduced from the optical disc 20. In other words, an intermittent reproducing operation is performed in such a manner that after a predetermined amount of data is reproduced, the reproducing operation is stopped until the next reproducing request is received. As with the recording operation, in the reproducing operation, when the system controlling microcomputer 9 issues a request to the drive controlling microcomputer 12, it issues a request to the servo circuit 15 so as to control the entire disc drive.

The reproduction signal that is output from the optical pickup 23 is input to the data modulator/demodulator 13. The data modulator/demodulator 13 demodulates the reproduction signal. The demodulated data is supplied to the error correction encoder/decoder 11. The error correction encoder/decoder 11 temporarily writes the reproduction data to the memory 10. The error correction encoder/decoder 11 performs a deinterleaving process and an error correcting process for the reproduction data. The error-corrected QuickTime movie file is written to the memory 7 through the memory controller 8.

A QuickTime movie file written to the memory 7 is output to a file decoder 6 in synchronization with a demultiplexing timing corresponding to a request issued by the system controlling microcomputer 9. The system controlling microcomputer 9 supervises the amount of data that is reproduced from the optical disc 20 and written to the memory 7 and the amount of data that is read from the memory 7 and output to the file decoder 6 so as to successively reproduce the video signal and the audio signal. In addition, the system controlling microcomputer 9 controls the memory controller 8 and the drive controlling microcomputer 12 so as to read data from the optical disc 20 in such a manner that the memory 7 does not overflow or underflow.

The file decoder 6 decodes a QuickTime movie file into a video elementary stream and an audio elementary stream under the control of the system controlling microcomputer 9. The video elementary stream is supplied to a video decoder 3. The audio elementary stream is supplied to an audio decoder 4. The video elementary stream and the audio elementary stream are synchronously output from the file decoder 6.

The video decoder 3 and the audio decoder 4 compression-decode the video elementary stream and the audio elementary stream and generate a video output signal and an audio output signal, respectively. In this example, the video signal and the audio signal have been encoded corresponding to MPEG. The video decoder 3 is composed of a buffer memory, a variable length code decoding portion, an inverse DCT portion, an inverse quantizing portion, an adding portion, and a local decoding portion. The adding portion adds an output signal of the inverse quantizing portion and a local decoded output signal. The local decoding portion is composed of a picture sequence rearranging portion, a frame memory, and a motion compensating portion.

When an intra encoding process is performed, the adding portion directly passes data, not performs the adding process. Decoded data is output from the adding portion to the picture sequence rearranging portion. The picture sequence rearranging portion rearranges the decoded pictures in the original order. Output data of the video decoder 3 is supplied to a display portion (not shown). The display portion is for example an LCD (Liquid Crystal Display). The output data of the video decoder 3 may be supplied to an external picture display device through an external output terminal. Output data of the audio decoder 4 is supplied to a sound generating portion (not shown). The sound generating portion is for example a speaker. Alternatively, the output data of the audio decoder 4 may be supplied to an external audio generating device through an external output terminal.

As was described above, since the optical disc 20 on which data is recorded is attachable and detachable, the data recorded on the optical disc 20 can be reproduced by another apparatus. For example, a personal computer that operates with QuickTime application software may read data recorded on the optical disc 20 and reproduce video data and audio data therefrom. It should be noted that the present invention can be applied to an apparatus that handles only video data or only audio data.

Figure 2:
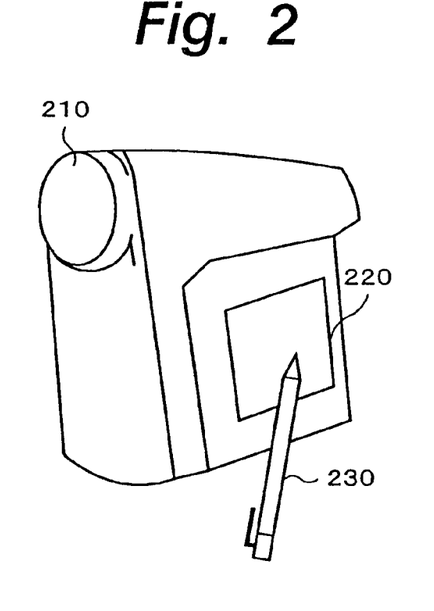
FIG. 2 is a schematic diagram showing an example of the outer shape of the embodiment of the present invention.

FIG. 2 is a perspective view showing the external structure of the embodiment of the present invention. Referring to FIG. 2, a lens 210 is an objective lens disposed at the forward end of the optical system. A display panel 220 displays a reproduced picture and indications corresponding to an operation mode. The display panel 220 has a display device such as an LCD and a piezoelectric device. By touching each indication portion with a pointing device 230, the user or the like can input an operation command for a reproducing operation and so forth.

Figure 3:
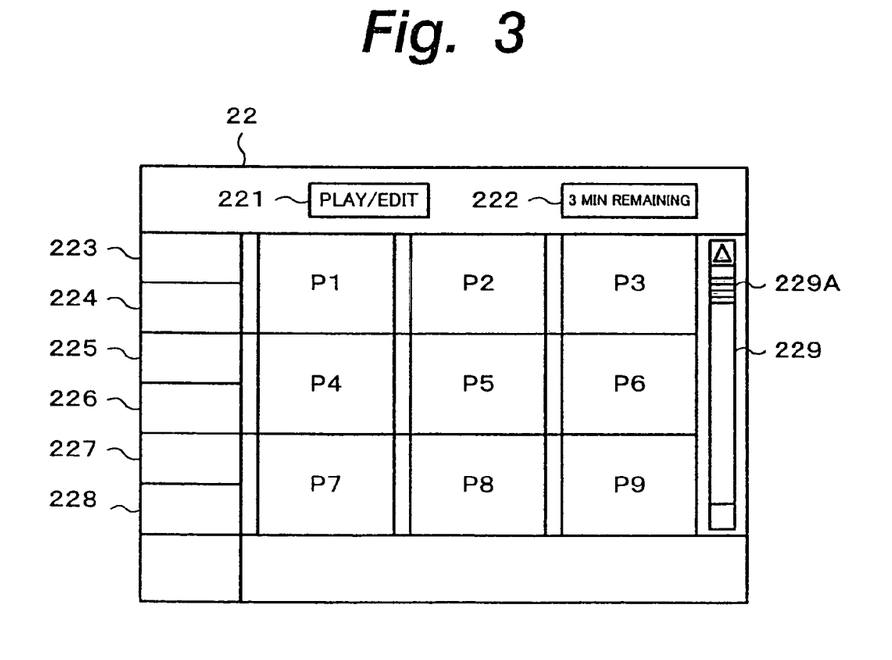
FIG. 3 is a schematic diagram showing an example of indication portions displayed on a display panel.

When a random-accessible disc shaped record medium is used, the user can select a desired file by inputting for example a file name thereof. However, when many files have been recorded on the record medium, it is difficult for the user to memorize the file name of the desired file. Thus, the operability for the reproducing operation and the editing operation may deteriorate. To solve such a problem, according to the embodiment of the present invention, as shown in FIG. 3, representative pictures P1 to P9 (referred to as thumbnail pictures) of for example nine files are displayed on the display panel 220 so that the user can select a desired file with reference thereto. When the user presses a desired thumbnail picture with the pointing device 230, he or she can select the desired file.

When the user presses indication portions 223, 224, 225, 226, 227, and 228 with the pointing device 230, he or she can input his or her desired command for a reproducing operation, an editing operation, or the like for a selected file. In this example, a sound corresponding to the picture selected with the pointing device 230 can be reproduced for a predetermined time period (for example, several seconds).

An indication portion 221 indicates an operation mode such as a reproducing and editing operation, a recording operation, or the like. On the other hand, an indication portion 222 indicates a recordable remaining time period. An indication portion 229 indicates a scroll bar that allows thumbnail pictures that cannot be displayed at a time to be displayed corresponding to a scrolling operation of an indication portion 229a operated with the pointing device 230. Thus, even if more than nine thumbnails have been recorded, they can successively displayed by the scrolling operation.

As a method for searching a file, according to the embodiment of the present invention, an index file that contains a set of parts of picture data and/or audio data of a plurality of files recorded on the disc shaped record medium is generated. The generated index file is recorded at a predetermined position of the disc shaped record medium. The index file can be generated in for example the QuickTime movie file format.

Figure 4:
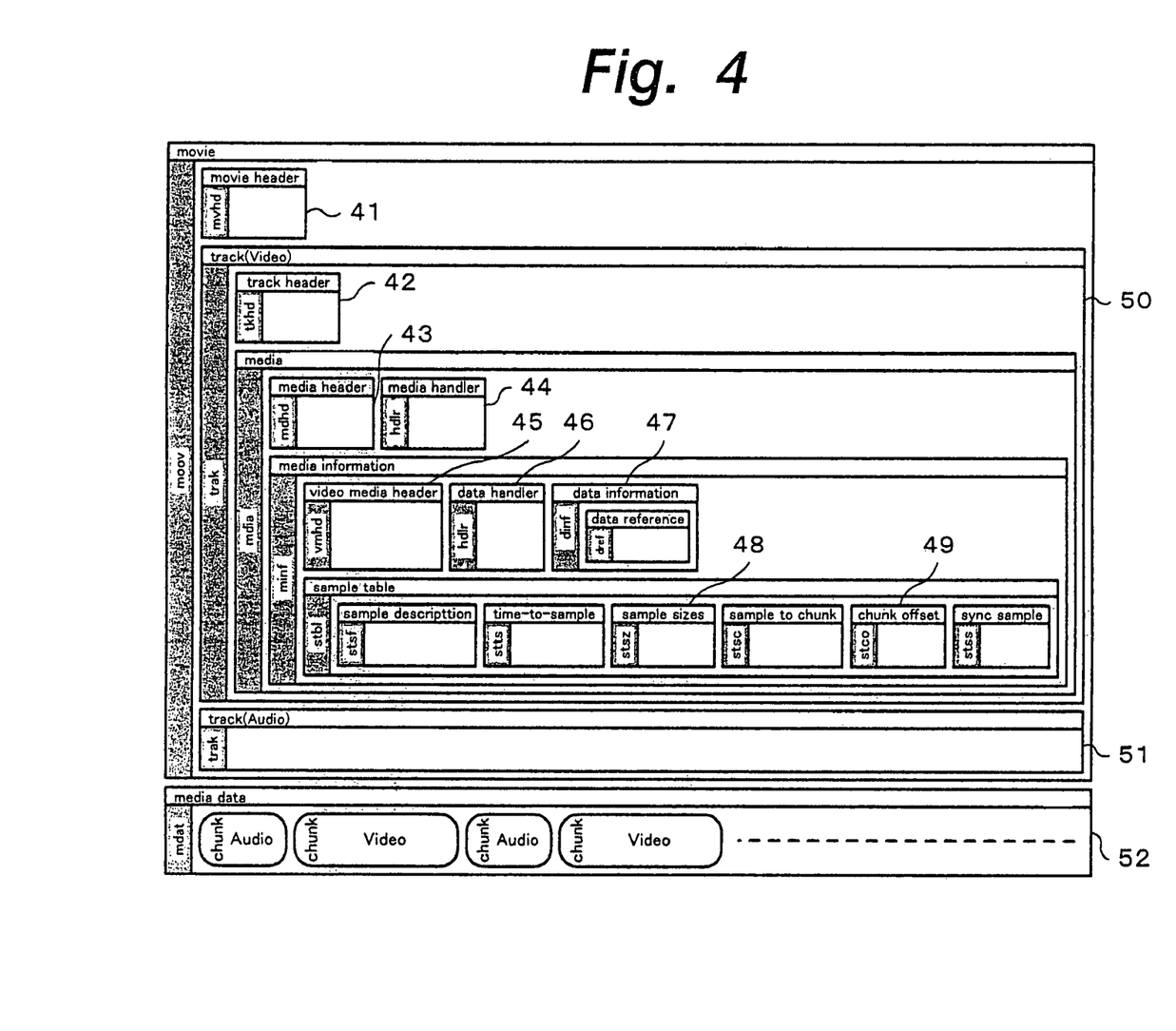
FIG. 4 is a schematic diagram showing an example of a QuickTime movie file.

Next, a QuickTime movie file will be described. FIG. 4 shows an example of a QuickTime movie file that allows both audio data and video data to be handled. The major structural portions of a QuickTime movie file are a movie resource portion and a movie data portion. The movie resource portion contains data that represents the duration for reproducing the file and data for referencing real data. The movie data portion contains real data of video data, audio data, and so forth.

Next, the movie resource portion will be described in detail. The movie resource portion contains a movie header 41 and tracks. The movie header 41 contains general file information. There are a plurality of tracks corresponding to the number of types of data. FIG. 4 shows an example of the internal structure of a video track 50 in detail. The video track 50 contains a track header 42 and a medium portion. The track header 42 contains general track information. The medium portion contains a medium header 43, a medium handler 44, and a medium information portion. The medium header 43 contains general medium information. The medium handler 44 contains medium data handling information.

The medium information portion contains a medium handler 45, a data handler 46, data information 47, and a sample table. The medium handler 45 contains picture medium information. The data handler 46 contains picture data handling information. The data information 47 contains data information. The sample table contains a sample description, a time-to-sample, a sample size 48, a sample-to-chunk, a chunk offset 49, a sync sample, and so forth. The sample description contains each sample. The time-to-sample represents the relation between a sample and the time base. The sample size 48 represents the size of the sample. The sample-to-chunk represents the relation between the sample and the chunk. The chunk offset 49 represents the start byte position of the chunk in the movie file. The sync sample contains synchronous information. In the QuickTime movie file format, the minimum data unit (for example, a picture in MPEG encoded data) is treated as a sample. As a set of samples, a chunk is defined. To improve the accessibility of data that is recorded and reproduced, successive samples are recorded in a chunk. An audio track 51 has a structure (not shown) similar to that of a video track.

On the other hand, the movie data portion contains audio data encoded corresponding to for example MPEG Audio Layer 2 and picture data encoded in the compression-encoding method corresponding to for example MPEG (Moving Picture Expert Group) method in the unit of chunks each of which is composed of a predetermined number of samples. However, it should be noted that the present invention is not limited to such an encoding method. In addition, the moving data portion may contain linear data that has not been compression-encoded.

Each track of the movie resource portion is correlated with data contained in the movie data portion. In other words, in the example shown in FIG. 3, since audio data and video data are handled, the movie resource portion contains a video track and an audio track. The movie data portion contains real data of the audio data and real data of the video data. When other types of data are handled, the movie resource portion contains their tracks and the movie data portion contains real data thereof. For example, when a text and MIDI are handled, the movie resource portion contains tracks of the text and the MIDI and the movie data portion contains real data thereof.

According to the embodiment of the present invention, an index file is generated with a QuickTime movie file. The index file handles data corresponding to types of data handled in a file to be searched. In this example, it is assumed that a file to be searched contains video data and audio data (hereinafter this file is referred to as AV file). In this case, the index file handles four types of data that are a property, a title, a thumbnail picture, and an intro-music. The property represents the attribute of the AV file. The title represents the title of the AV file. The thumbnail picture is a representative picture of for example the first picture of the AV file. The intro-music is typical audio data of for example the first several seconds of the AV file.

Figure 5:
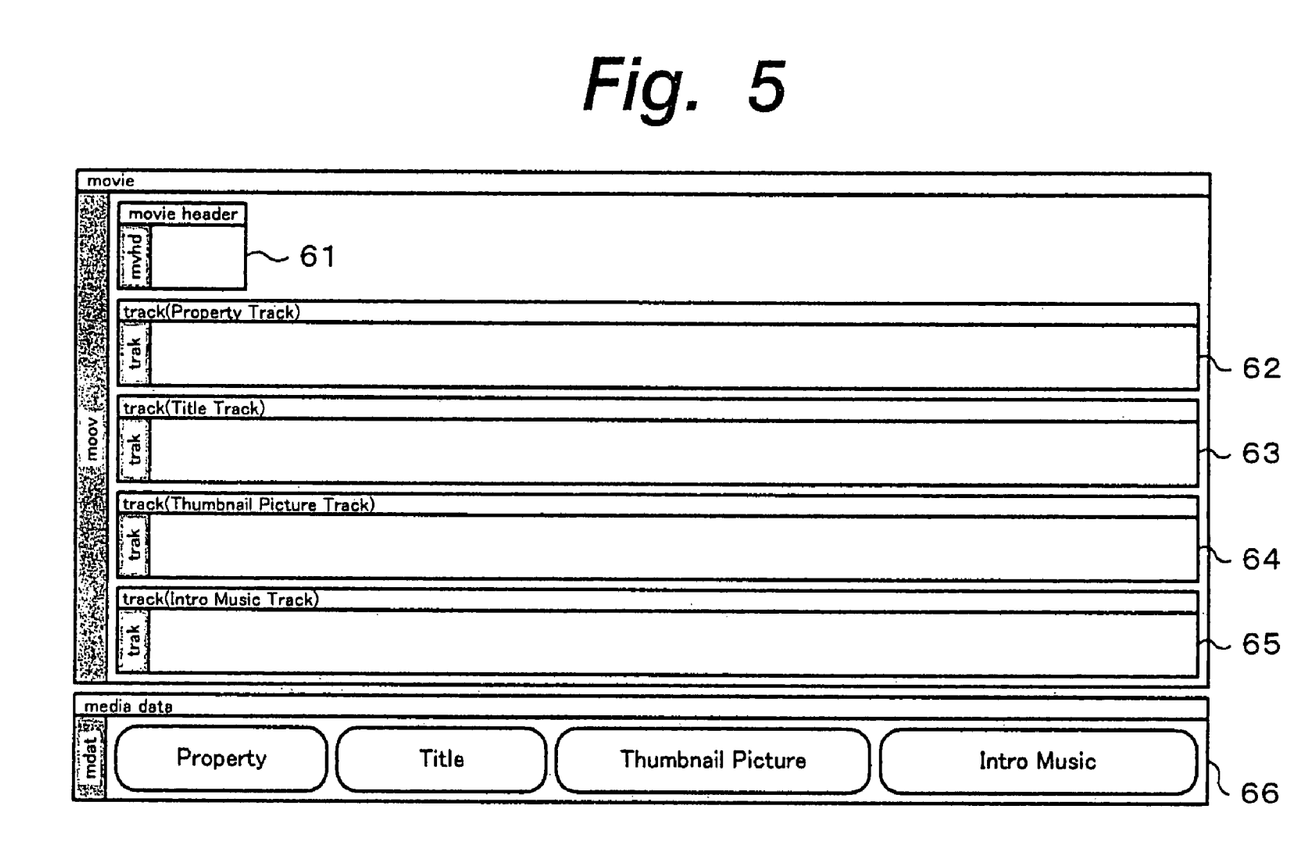
FIG. 5 is a schematic diagram showing an example of an index file according to the present invention.

FIG. 5 shows an example of the structure of the index file generated with a QuickTime movie file. In this example, the movie resource portion contains tracks corresponding to four types of data that are a property track 62, a title track 63, a thumbnail picture track 64, and an intro-music track 65 as well as a movie header 61. However, only the property track 62 is an essential track. The other tracks are used corresponding to the types of data that the index file handles. In this example, the movie data portion contains four types of real data that are a property, a title a thumbnail picture, and an intro-music. Likewise, only the property data is essential data. The other types of real data are used corresponding to the types of data that the index file handles.

Figure 6:
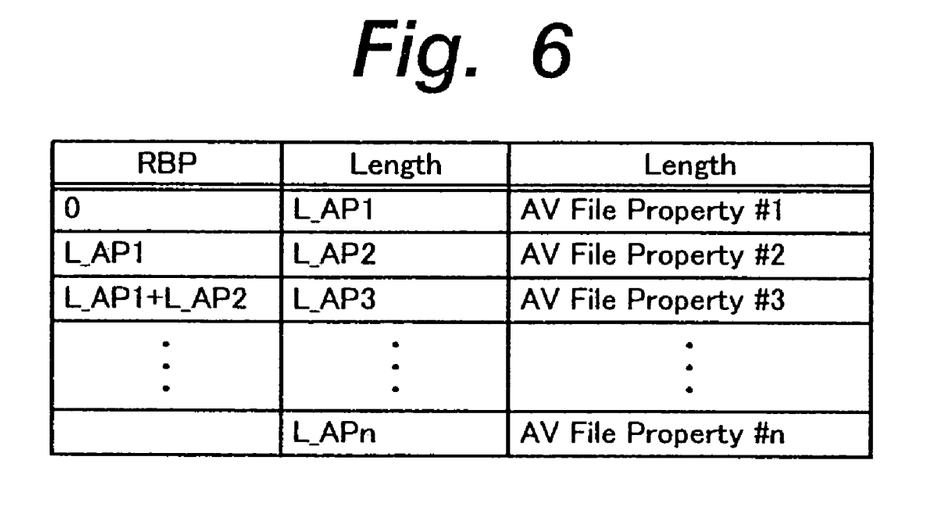
FIG. 6 is a table for explaining a property track in detail.

FIG. 6 shows a table of an example of the property track 62. Each of AV File Property #1, AV File Property #2, . . . , and AV File Property #n defined as chunks of properties of individual AV files has a data length (variable length represented in bytes) (L_AP1, L_AP2, . . . , and L_APn) and a start byte position (0, L_AP1, L_AP1+L_AP2, . . . ).

Figure 7:
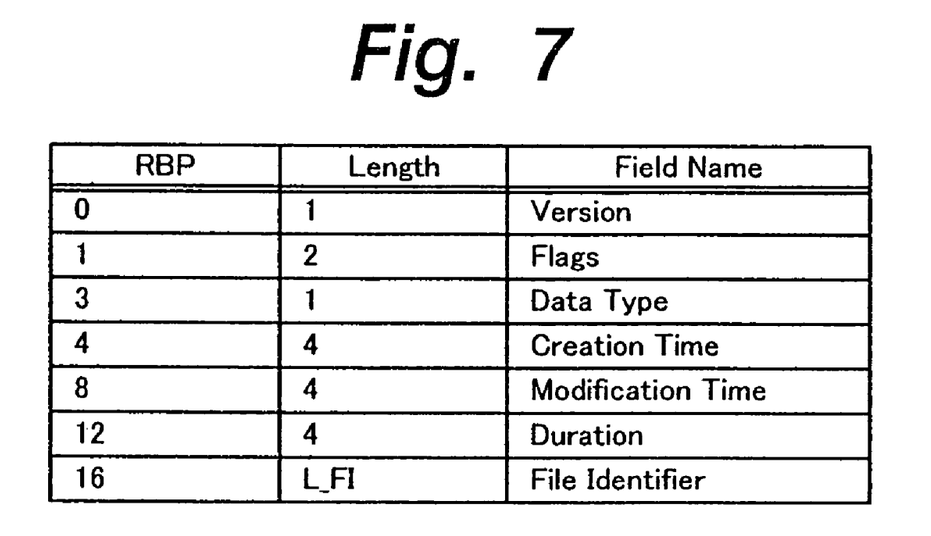
FIG. 7 is a table for explaining property data in detail.

FIG. 7 shows an example of property data (real data) of each AV file. One byte starting with byte 0 represents version information. Two bytes starting with byte 1 represent a flag area (that will be described later). One byte starting with byte 3 represents a data type such as a moving picture, a still picture, audio, or the like. Four bytes starting with byte 4 represents date and time of creation of the AV file. Four bytes starting with byte 8 represents date and time of last change of the AV file.

Four bytes starting with byte 12 represent the duration of the reproduction of the AV file. L_F1 bytes (variable bytes) starting with byte 16 represent the file name of the AV file. Thus, as was described above, the data lengths of property data of the AV files are represented as variable length L_AP1, L_AP2, . . . , and L_APn.

Figure 8:
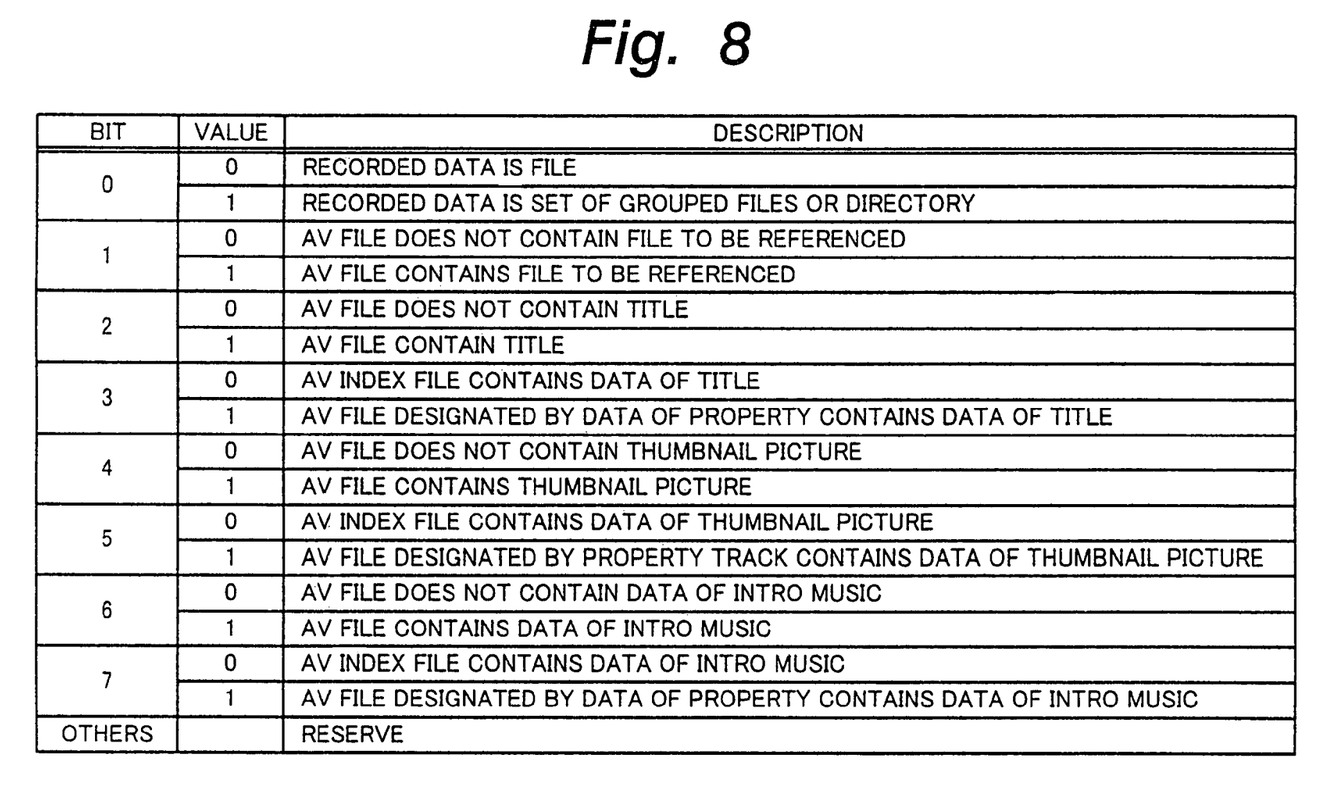
FIG. 8 is a table for explaining a part of the property data in more detail.

FIG. 8 shows an example of the structure of the flag area. When the recorded data is a file, bit 0 is 0. When the recorded data is a set of grouped files or a directory, bit 0 is 1. When there is no file to be referenced to the AV file, bit 1 is 0. When there is a file to be referenced to the AV file, bit 1 is 1. When the AV file does not contain a title, bit 2 is 0. When the AV file contains a title, bit 2 is 1. When the index file contains data of a title, bit 3 is 0. When data of a title is contained in an AV file designated by property data, bit 3 is 1. When the AV file does not contain a thumbnail picture, bit 4 is 0. When the AV file contains a thumbnail picture, bit 4 is 1.

When the index file contains data of a thumbnail picture, bit 5 is 0. When an AV file designated by property data contains data of a thumbnail picture, bit 5 is 1. When the AV file does not contain data of an intro-music, bit 6 is 0. When the AV file contains data of an intro-music, bit 6 is 1. When the AV file contains data of an intro-music, bit 7 is 0. When an AV file designated by property data contains data of an intro-music, bit 7 is 1. Bits 8 to 15 are reserved.

Figure 9:
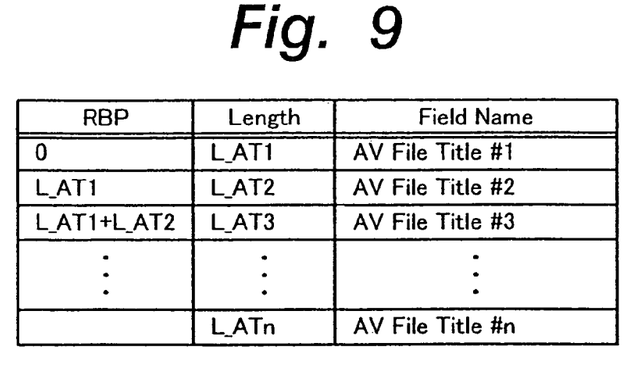
FIG. 9 is a table for explaining a title track in detail.

FIG. 9 shows a table of an example of the structure of the title track 63. According to the embodiment of the present invention, a title can be registered to each AV file to be searched. The registered title is placed as real data in the movie data porion. The data length and the start position of the title of each AV file are represented with the title track. As shown in FIG. 9, the title track is defined as a chunk corresponding to title data of each AV file. Each of AV File Title #1, AV File Title #2, . . . , and AV File Title #n defined as chunks of title data of the individual AV files has a data length (variable length represented in bytes) L_AT1, L_AT2, . . . , and L_ATn and a start byte position 0, L_AT1, L_AT1+L_AT2, . . .

Figure 10:
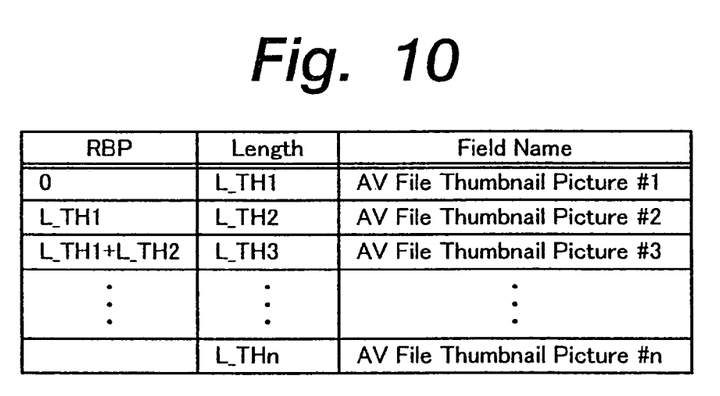
FIG. 10 is a table for explaining a thumbnail track in detail.

FIG. 10 shows an example of the structure of the thumbnail picture track 64. According to the embodiment of the present invention, one thumbnail picture can be registered to each AV file to be searched. The registered thumbnail picture is placed as real data in the movie data portion. The data length and the start position of a thumbnail picture of each AV file are represented with the thumbnail track. Each of AV File Thumbnail #1, AV File Thumbnail #2, and AV File Thumbnail #n defined as chunks of thumbnail data of individual AV files has a data length (variable length represented in bytes) L_TH1, L_TH2, . . . , and L_THn and a start byte position 0, L_TH1, L_TH1+L_TH2, . . . .

Figure 11:
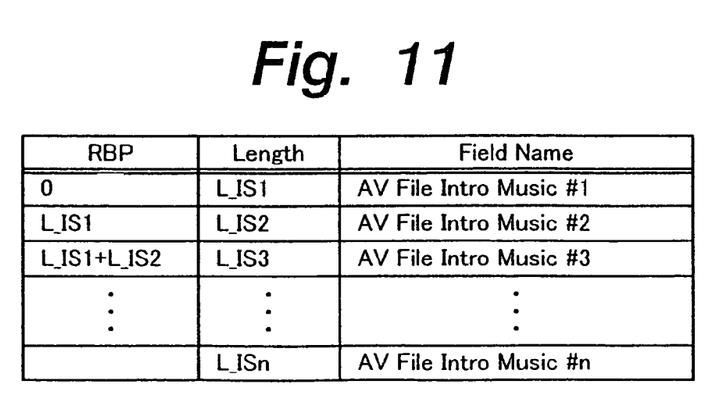
FIG. 11 is a table for explaining an intro-music track in detail.

FIG. 11 shows an example of the structure of the intro-music track 65. According to the embodiment of the present invention, one intro-portion (of for example the first five seconds) of audio data can be registered to each AV file to be searched. An intro-music to be registered is placed as real data in the movie data portion. The data length and the start position of an intro-music of each AV file are represented with the intro-music track. Each of AV File Intro Music #1, AV File Intro Music #2, . . . and AV File Intro Music #n defined as chunks of intro-musics of individual AV files has a data length (variable length represented in bytes) L_IS1, L_IS2, . . . , and L_ISn and a start byte position 0, L_IS1, L_IS1+L_is 2, . . . .

Figure 12:
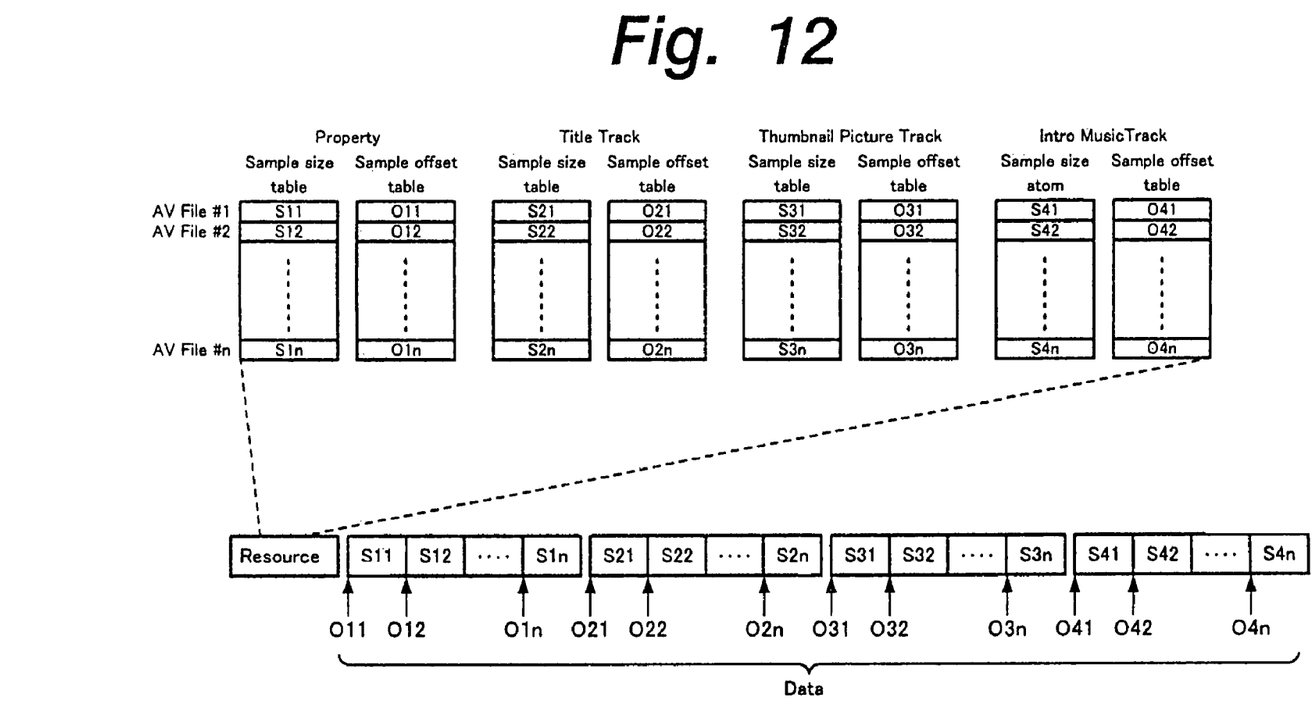
FIG. 12 is a schematic diagram for explaining a designation for real data on the property track and so forth.

In the QuickTime movie file format, data contained in the property track 62, the title track 63, the thumbnail picture track 64, the intro-music track 65, and so forth is represented in the QuickTime movie file format as shown in FIG. 12. As was described above, the medium information portion of each track of the movie resource portion contains a sample size table and a chunk offset table (see FIG. 4). The sample size tables of the property track 62, the title track 63, the thumbnail picture track 64, and the intro-music track 65 contain property data, title data, thumbnail picture data, and intro-music data of each AV file.

S11, S12, . . . , S1n represent the sizes of property data of AV File #1, AV File #2, . . . , and AV File #n, respectively. S31, S32, . . . , S3n represent the sizes of data of thumbnail pictures of AV File #1, AV File #2, . . . , and AV File #n, respectively. S41, S42, and S4n represent the sizes of intro-music data of AV File #1, AV File #2, . . . and AV File #n, respectively.

Likewise, the chunk offset table contains record start byte positions of the property, the title, the thumbnail picture data, and the intro-music data of each AV file. O11, O12, . . . , and O1n represent the start byte positions of property data of AV File #1, AV File #2, . . . , and AV File #n, respectively. O21, O22, . . . , O2n represent the start byte positions of the titles of AV File #1, AV File #2, . . . , and AV File #n, respectively. O31, O32, . . . , and O3n represent the start byte positions of the thumbnail pictures of AV File #1, AV File #2, . . . , and AV File #n, respectively. O41, O42, . . . , and O4n represent the start byte positions of the intro-music data of AV File #1, AV File #2, . . . , and AV File #n, respectively.

In the above-described structure, the property data, the title data, the thumbnail picture data, the intro-music data, and so forth of each AV file can be accurately accessed in the movie data portion.

Figure 13:
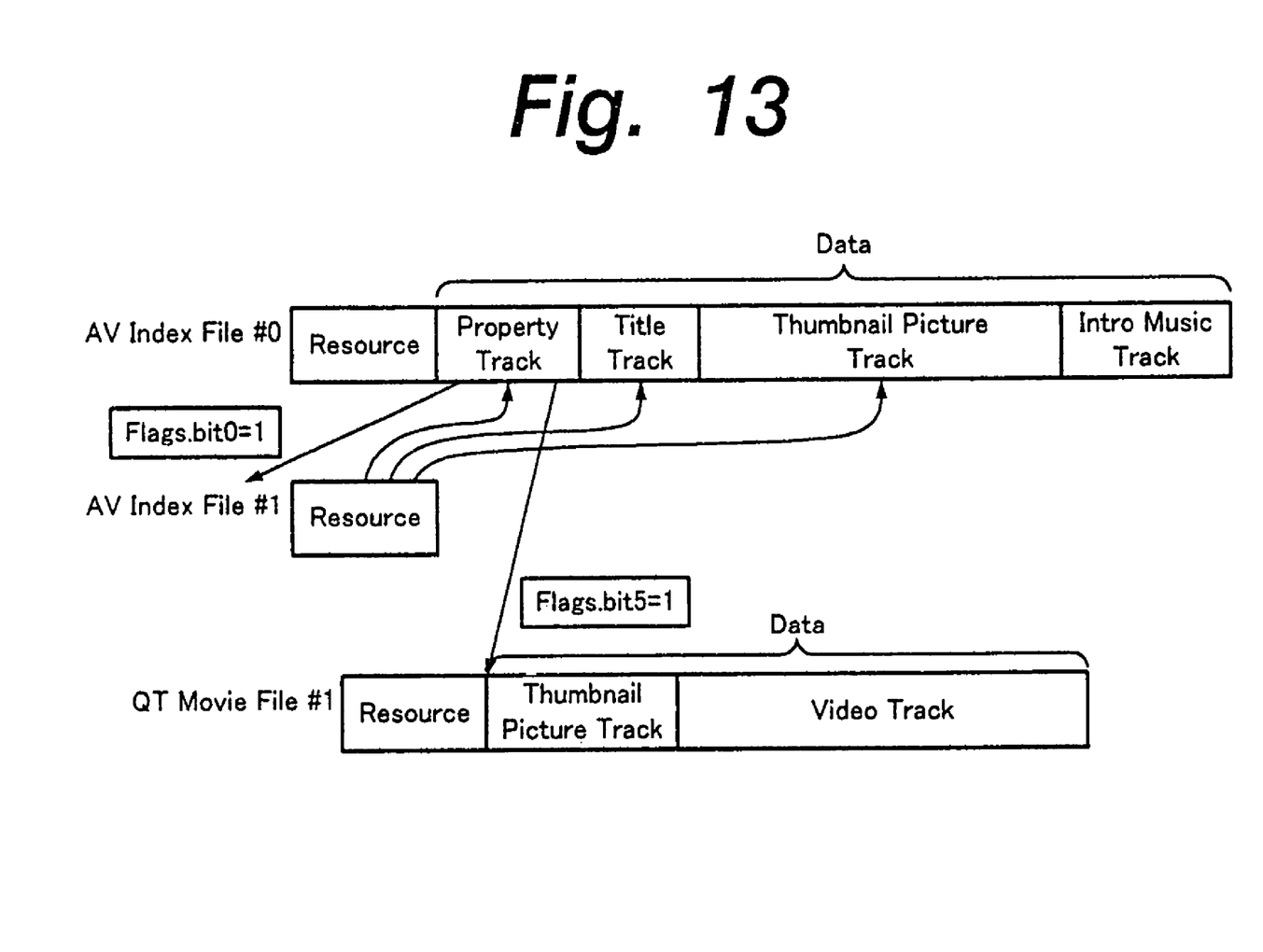
FIG. 13 is a schematic diagram for explaining a designation issued from another file for a part of data contained in a move data portion.

In the above description, data to be searched is output corresponding to an AV index file containing a movie resource portion and a movie data portion. Alternatively, by designating data contained in the movie data portion of another index file with a file containing only a movie resource portion, video data, audio data, and so forth to be searched can be output. Next, such a case will be described. It is assumed that an AV Index File #0 containing a movie resource portion and a movie data portion and an AV Index File #1 containing only a movie resource portion have been recorded as shown in FIG. 13. When bit 0 of the flag area of the property data of AV Index File #0 is "1", recorded data is a set of grouped files or a directory (see FIG. 8). As a source portion of real data contained in a set of grouped files or a directory, AV Index File #1 is designated.

AV Index File #1, which is a second index file, contains a part of the movie data portion of AV Index File #0, which is a first index file (for example, the data size, the start byte position, and so forth of each of the property data, the title data, and the thumbnail picture data of each AV file as shown in FIG. 13). Alternatively, AV Index File #1 can designate only a part of movie data portion of AV Index File #0 corresponding to a particular AV file. Thus, only one of stored title data, thumbnail picture data, intro-music data, and so forth can be output so as to search a desired AV file. Alternatively, a process for outputting data corresponding to only a part of AV files recorded on the record medium can be performed. Thus, the user can filter a search range and then perform a searching operation.

In addition, data contained in the movie resource portion of the index file may be correlated with data contained in the movie data portion of another index file. For example, when bit 5 of the flag area of the property data of AV Index File #0 is "1", data of the thumbnail picture is contained in a file designated by the property track (see FIG. 8). The designated file is QT Movie File #1. QT Movie File #1 contains a movie resource portion and a movie data portion. The movie data portion contains thumbnail picture data and conventional video data.

Thus, data to be searched can be handled in other than the above-described index file format. Thus, the format of a file to be searched becomes more flexible. The movie data portion of QT Movie File #1 contains data of the thumbnail picture. Alternatively, the movie data portion may contain title data and intro-music data. In this case, bit 7 of the flag area of the property data of AV Index File #0 is "1".

Figure 14:
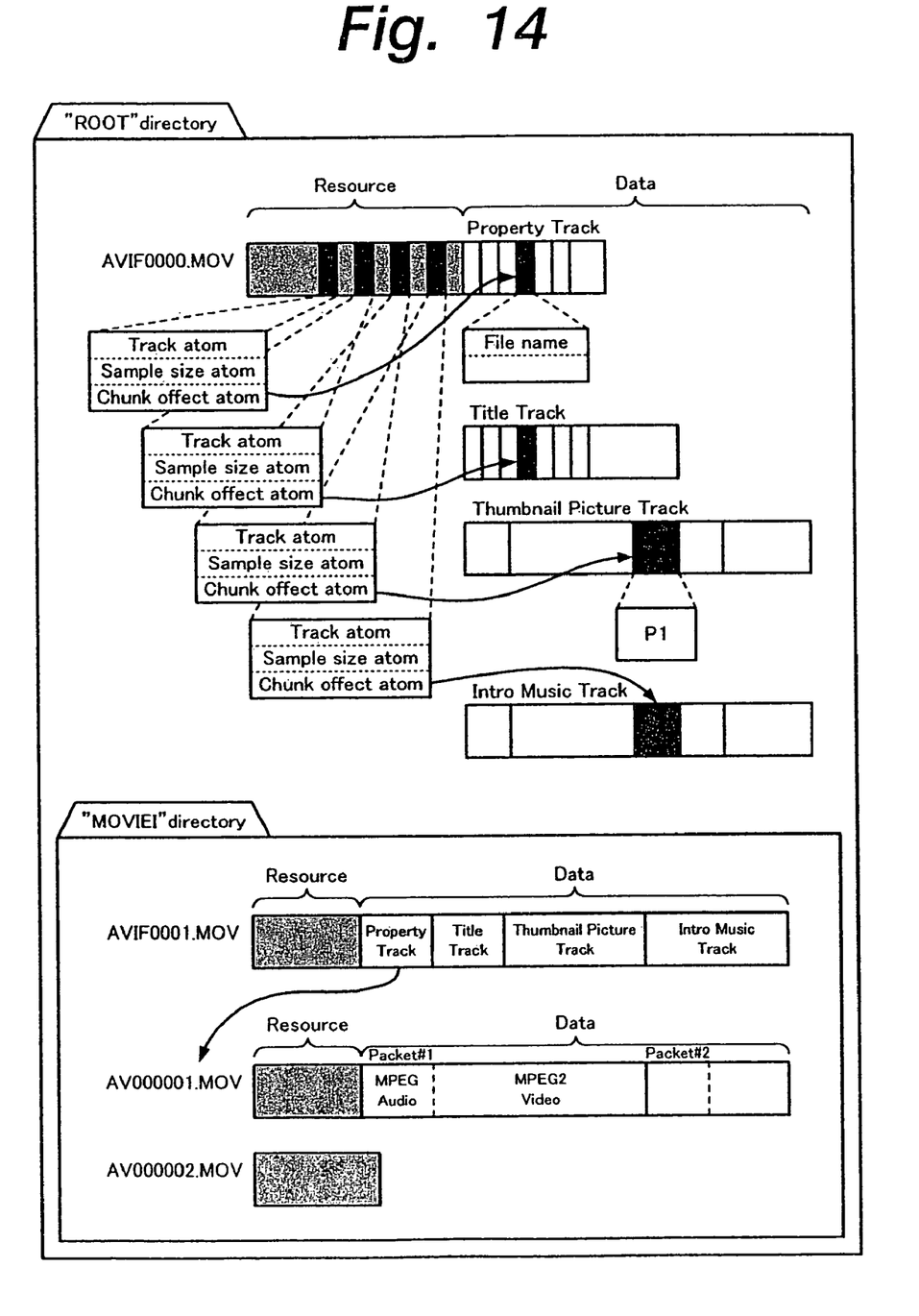
FIG. 14 is a schematic diagram for explaining a hierarchical structure of a directory.

When bit 0 of the flag area of the property data is "1" and recorded data is a set of grouped files or a directory, data can be hierarchically handled. In other words, as shown in FIG. 14, index file AVIF0000.MOV containing a movie resource portion and a movie data portion is treated as a root directory. The movie resource portion of AVIF0000.MOV contains the sample size and chunk offset that designate the property data, title data, thumbnail picture data, intro-music data, and so forth contained in the movie data portion of AVIF0000.MOV.

At this point, since the title data contains a file name, AVIF0001.MOV is designated as a lower hierarchical directory. Since AVIF0001.MOV has the QuickTime movie file format, the property data designates AV000001.MOV and AV000002.MOV as other (lower hierarchical) directories. Thus, data can be hierarchically handled in such a hierarchical file structure.

Figure 15:
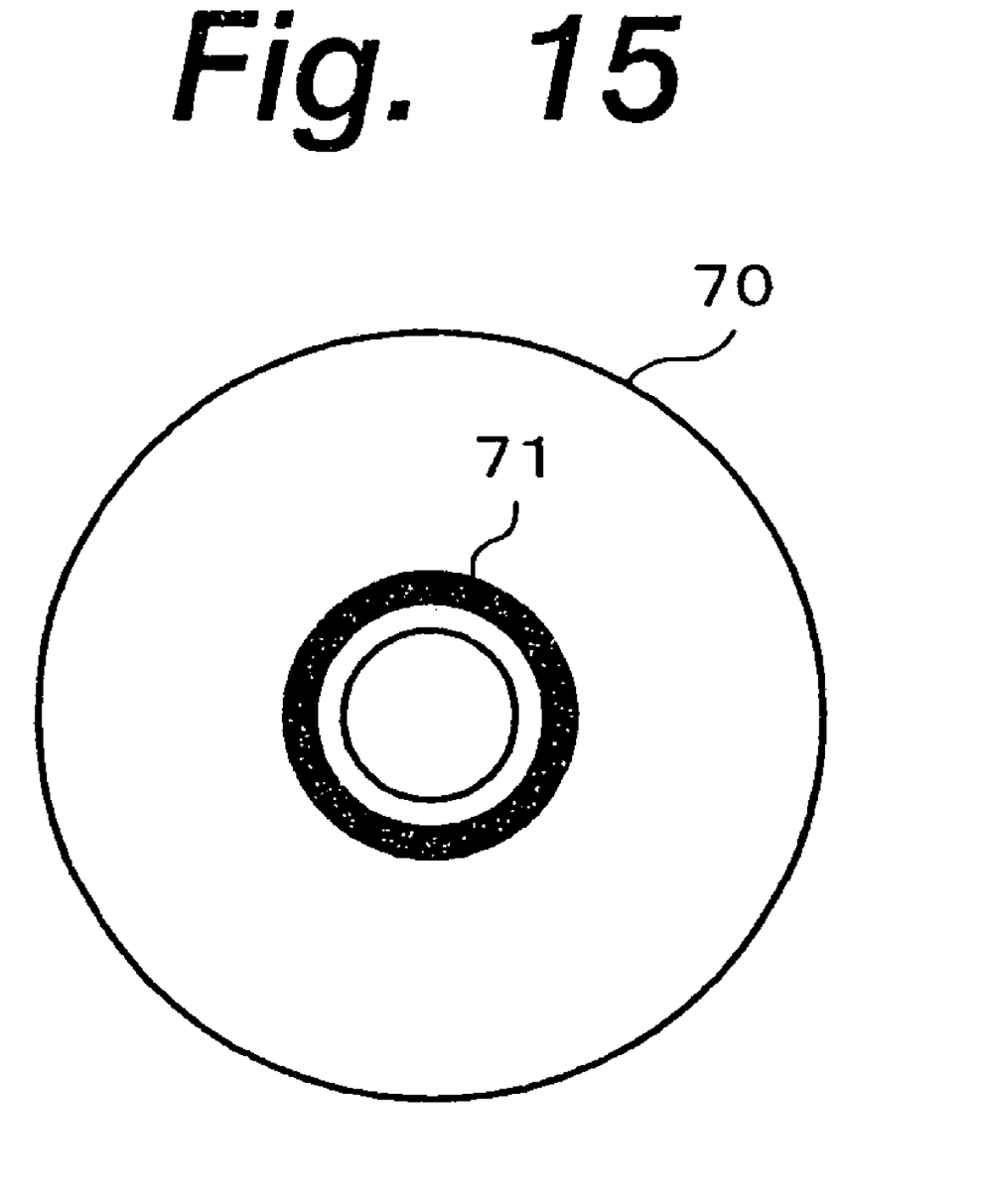
FIG. 15 is a schematic diagram for explaining a record position of an index file.

As shown in FIG. 15, the index file is recorded at a predetermined position (for example, the innermost peripheral position 21) of the disc shaped record medium 20. When a reproducing and editing mode gets started, the index file is initially reproduced. Thus, when the reproducing and editing mode gets started, a searching screen as shown in FIG. 2 is displayed. Conventional AV files are recorded in the other record area.

According to the embodiment of the present invention, data of the index file for searching a desired-AV file is output using the display panel, the speaker, or the like of the recording apparatus. In addition, the present invention can be applied to the case that the reproducing and editing operation is performed using an external apparatus that outputs video data, audio data, and/or the like.

The present invention is not limited to the compression-encoding method used in recording video data, audio data, and/or the like. Instead, the present invention can be applied to data that can be handled in for example QuickTime movie file format.

According to the present invention, outlined information of each of a plurality of files recorded on a disc shaped record medium is output. With reference to the outlined information, a desired file can be easily searched.

Thus, when the reproducing and editing operation is performed, data to be operated can be easily accessed and thereby the operability can be improved.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A digital recording apparatus usable with a recording medium, comprising:
    means for extracting information of each of a plurality of files recorded on the recording medium;
    means for correlating the extracted information and the plurality of files and generating a first index file,
        wherein the extracted information includes property information, and at least one of thumbnail information or title information, in which the property information pertains to a number of attributes of said plurality of files;
    means for recording the first index file on the recording medium; and
    means for designating a second index file containing resource information which includes data size and start byte position of each of the property information, the thumbnail information and the title information of each of the plurality of files recorded on the recording medium.

2. The recording apparatus as set forth in claim 1, wherein the first index file includes at least the property information.

3. The recording apparatus as set forth in claim 2, wherein the property information includes data indicating whether or not the first index file includes thumbnail information.

4. The recording apparatus as set forth in claim 3, wherein the data included in the property information indicates that the thumbnail information is contained in a file designated by the first index file.

5. The recording apparatus as set forth in claim 2, wherein the property, information includes data indicating whether or not the first index file includes title information.

6. The recording apparatus as set forth in claim 5, wherein the data included in the property information indicates that the title information is contained in a file designated by the first index file.

7. The recording apparatus as set forth in claim 1, wherein the first index file is recorded to a predetermined position of the recording medium.

8. The recording apparatus as set forth in claim 7, wherein the first index file is recorded in an innermost peripheral record area of the recording medium.

9. The recording apparatus as set forth in claim 1 wherein when a predetermined operating mode is started, the extracted information is reproduced and the reproduced information is output in such a manner that it is correlated with each of the plurality of files.

10. The recording apparatus as set forth in claim 9, wherein the predetermined operation mode is a reproducing mode and/or an editing mode.

11. The recording apparatus as set forth in claim 1, wherein the extracted information contains attribute data of the plurality of files.

12. The recording apparatus as set forth in claim 11, wherein the attribute data includes date and time data that represent the date and time at which each of the plurality of files was recorded.

13. The recording apparatus as set forth in claim 11, wherein the attribute data includes date and time data that represent the date and time at which each of the plurality of files was changed.

14. The recording apparatus as set forth in claim 11, wherein the attribute data includes duration data that represents a duration or durations of each of the plurality of files.

15. The recording apparatus as set forth in claim 11, wherein the attribute data includes type data that represents the type of each of the plurality of files.

16. The recording apparatus as set forth in claim 1, wherein the extracted information includes title information that represents the title of each of the plurality of files.

17. The recording apparatus as set forth in claim 1, wherein the extracted information includes a part of video data contained in each of the plurality of files.

18. The recording apparatus as set forth in claim 1, wherein the extracted information includes a part of audio data contained in each of the plurality of files.

19. The recording apparatus as set forth in claim 1, wherein the first index file contains a first area and a second area, the first area having an aggregation of the information, the second area containing correlative information of the information and the remaining data of the files and position information representing the positions of the information of each of the plurality of files.

20. The recording apparatus as set forth in claim 19, wherein the second area contains correlative information of the information and the remaining data of a group selected from the plurality of files.

21. The recording apparatus as set forth in claim 19, wherein the second index file, which is recorded on the recording medium, contains the same data as the second area, with the position information representing the positions of the information in the first area, the plurality of types of data of the plurality of files recorded on the recording medium being able to be easily searched when an operation mode including a reproducing operation is performed.

22. The recording apparatus as set forth in claim 21, wherein the second index file contains information for correlating the information and the remaining data of a group selected from the plurality of files recorded on the recording medium.

23. The recording apparatus as set forth in claim 19, wherein the second area designates data of the first area of the second index file.

24. The recording apparatus as set forth in claim 19, wherein the second area designates data of a different file.

25. The recording apparatus as set forth in claim 24, wherein the different file contains the extracted information.

26. A digital recording method usable with a recording medium, comprising steps of:
   extracting information of each of a plurality of files recorded on the recording medium;
   correlating the extracted information and the plurality of files and generating a first index file,
      wherein the extracted information includes property information, and at least one of thumbnail information or title information, in which the property information pertains to a number of attributes of said plurality of files;
   recording the first index file on the recording medium; and
   designating a second index file containing resource information which includes data size and start byte position of each of the property information, the thumbnail information and the title information of each of the plurality of files recorded on the recording medium.

27. The digital recording method as set forth in claim 26, wherein the first index file includes at least the property information.

28. The digital recording method as set forth in claim 27, wherein the property information includes data indicating whether or not the first index file includes thumbnail information.

29. The digital recording method as set forth in claim 28, wherein the data included in the property information indicates that the thumbnail information is contained in a file designated by the first index file.

30. The digital recording method as set forth in claim 27, wherein the property information includes data indicating whether or not the first index file includes title information.

31. The digital recording method as set forth in claim 30, wherein the data included in the property information indicates that the title information is contained in the file designated by the first index file.

32. A computer-readable storage medium for storing a program for recording a plurality of files and first index file of each of the plurality of files, the program comprising:
   correlating the plurality of files and extracted information of each of the plurality of files and generating a first index file,
      wherein the extracted information includes property information, and at least one of thumbnail information or title information, in which the property information pertains to a number of attributes of said plurality of files;
   recording the first index file on the recording medium, and
   designating a second index file containing resource information which includes data size and start byte position of each of the property information, the thumbnail information and the title information of each of the plurality of files.

33. The program for recording as set forth in claim 32, wherein the first index file includes at least the property information.

34. The program for recording as set forth in claim 33, wherein the property information includes data indicating whether or not the first index file includes thumbnail information.

35. The program for recording as set forth in claim 34, wherein the data included in the property information indicates that the thumbnail information is contained in a file designated by the first index file.

36. The program for recording as set forth in claim 3, wherein the property information includes data indicating whether or not the first index file includes title information.

37. The program for recording as set forth in claim 36, wherein the data included in the property information indicates that the title information is contained in a file designated by the first index file.

38. A digital recording apparatus usable with a recording medium, comprising:
   means for generating image data;
   means for recording the image data as an image file on the recording medium;
   means for extracting information of each of a plurality of image files recorded on the recording medium;
   means for correlating the extracted information and the plurality of image files and generating a first index file,
      wherein the extracted information includes property information, and at least one of thumbnail information or title information, in which the property information pertains to a number of attributes of said plurality of files;
   means for recording the first index file on the recording medium; and
   means for designating a second index file containing resource information which includes data size and start byte position of each of the property information, the thumbnail information and the title information of each of the plurality of image files recorded on the recording medium.

39. The digital recording apparatus as set forth in claim 38, wherein the first index file includes at least the property information.

40. The digital recording apparatus as set forth in claim 39, wherein the property information includes data indicating whether or not the first index file includes thumbnail information.

41. The digital recording apparatus as set forth in claim 40, wherein the data included in the property information indicates that the thumbnail information is contained in a file designated by the first index file.

42. The digital recording apparatus as set forth in claim 39, wherein the property information includes data indicating whether or not the first index file includes title information.

43. The digital recording apparatus as set forth in claim 42, wherein the data included in the property information indicates that the title information is contained in a file designated by the first index file.

44. The digital recording apparatus as set forth in claim 38, further comprising:
   means for displaying the representative image data on a screen device; and
   means for pointing the representative image data on the screen device;
   wherein the image data is regenerated on the screen device based on the extracted information when the representative image data is pointed.

* * * * *